Patented Apr. 27, 1954

2,676,978

UNITED STATES PATENT OFFICE 2,676,978

PARA-ALKOXY-BENZALACETOPHENONE THIOSEMICARBAZONES

Hans Schmidt, Wuppertal-Vohwinkel, and Robert Behnisch and Ernst Schraufstatter, Wuppertal-Elberfeld, Germany, assignors to Schenley Industries, Inc., New York, N. Y., a corporation of Delaware No Drawing. Application December 19, 1951, Serial No. 262,492

Claims priority, application Germany January 8, 1951

6 Claims. (Cl. 260—470)

1

This invention relates generally to organic chemical compounds that are useful in chemotherapy and, in a more particular sense, it is concerned with a group of novel cinnamyl aryl ketone thiosemicarbazones, specifically alpha substituted cinnamyl aryl ketone thiosemicarbazones, which are characterized by especially strong inhibitory effects upon pathogenic microorganisms, including those that cause tuberculosis, and which are useful also in the treatment of bacterial inflammation.

It has been found, when testing the efficacy of various aromatic thiosemicarbazones against tuberculosis, that the aromatic aldehyde thiosemicarbazones, generally, have a stronger inhibitory effect than aromatic ketone thiosemicarbazones as a group. Furthermore, compounds of the latter type have been thought to be, generally speaking, essentially more toxic than the former type of compound and even ineffective for use against pathogens of this type.

It is now found, according to this invention, that a particular, limited, group of substituted cinnamyl aryl ketone thiosemicarbazones is an exception to these generalities, and that these compounds have a low toxicity and are highly effective against tubercle bacilli. This new group of compounds consists of the cinnamyl aryl ketone thiosemicarbazones bearing a substituent group in the alpha position of the cinnamyl moiety chosen from the group consisting of halogen, hydroxy, lower alkoxy, lower alkyl, mono-homocyclic aryl, carboxy, lower carbalkoxy and carbamyl, of which lower alkyl, lower alkoxy, mono-homocyclic aryl, carboxy and lower carbalkoxy constitute a presently preferred group having superior therapeutic properties.

These compounds may have, additionally, one or more therapeutically activating substituents at either the benzene or the aryl nucleus or at both nuclei. By the term therapeutically activating substituents is meant, for example, substituents such as halogen, amino, acylamino, alkylamino, hydroxy, lower alkoxy, aryloxy, acyloxy, alkylmercapto, nitro, carboxy, carboxyalkyl, or alkylsulfone substituent groups. The benzene nucleus of the cinnamyl moiety or the aryl nucleus or both, may bear one or more of these therapeutically activating substituents, or combinations thereof. The aryl moiety may be a simple homocyclic or a simple heterocyclic mononuclear aromatic group.

These new compounds are distinguished, not only by having a high tuberculostatic effect, superior to that of benzalacetone thiosemicar-

2 bazone, but additionally by having a surprisingly good compatibility and tolerance when administered. Furthermore, the compounds according to the present invention are distinguished, apart from their potency against tuberculosis-producing bacteria, by their activity against microorganisms that cause bacterial inflammation.

The novel compounds of this invention may be represented by the formula:

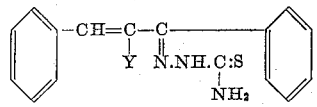

wherein Y is of the group consisting of hydrogen, lower alkoxy, lower alkyl, mono-homocyclic aryl, carboxy, and lower carbalkoxy.

As above mentioned, either of the aromatic nuclei may bear a therapeutically activating substituent, or more than one substituent, which may be in the ortho, meta or para positions, selected from the group consisting of aryloxy, lower alkoxy, halogen, amino, alkylamino, acylamino, nitro, hydroxy, acyloxy, alkylmercapto, alkylsulfone, carboxy and carboxyalkyl groups.

This new group of therapeutically active thiosemicarbazones according to this invention may be prepared by reacting thiosemicarbazide upon the corresponding cinnamyl aryl ketones, substituted in the alpha position, in the conventional manner, using catalysts if necessary. If desired, modification or exchange of the substituents may be effected after preparation of the thiosemicarbazones.

To illustrate typical procedures for preparing these substituted cinnamyl aryl ketone thiosemicarbazones, the following examples are provided, without intention that they will be construed as limitations upon the invention.

Example 1

Preparation of:

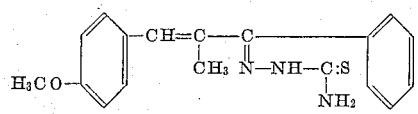

About 12.6 grams of α-methyl-4-methoxy-benzal-acetophenone (B. P. 216–220° C. under 8 mm. pressure, which may be prepared by condensing propiophenone with p-methoxy-benzaldehyde in the presence of gaseous hydrogen chloride) and 4.5 grams of thiosemicarbazide in 500 cc. of ethyl alcohol are boiled for 4 days. The alcohol is then distilled off from the mixture, which is subsequently boiled with ligroin and then with water to remove unreacted starting materials. The residue which is recrystallized from 80% ethanol, is α-methyl-4-methoxybenzal, acetophenone thiosemicarbazone, which melts at 156° C.

*Example 2*

Preparation of:

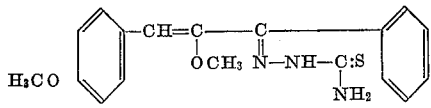

About 13.4 grams of α-methoxy-4-methoxy-benzalacetophenone and 4.5 grams of thiosemicarbazide are boiled together for 3 days in 500 cc. of ethyl alcohol, then the alcohol is distilled off and the residue is treated with boiling ligroin and with water. The residue remaining is α-methoxy-4-methoxy-benzalacetophenone thiosemicarbazone, which melts at 163° C. after being recrystallized from 80% alcohol.

*Example 3*

Preparation of:

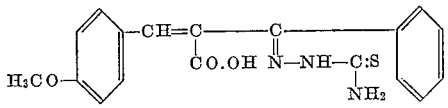

About 15.5 grams of α-carboethoxy-4-methoxy-benzalacetophenone (M. P. 92° C., which may be prepared by condensing ethyl benzoylacetate and anisaldehyde) and 4.5 grams of thiosemicarbazide are boiled together for 4 days in 500 cc. of ethyl alcohol. After distilling off the alcohol, the mixture is boiled with ligroin and water, and the residue is recrystallized from 90% alcohol. The α-carboethoxy-4-methoxy-benzalacetophenone thiosemicarbazone thus obtained melts at 172° C. By saponification of this compound with alcoholic soda lye, α-carboxy-4-methoxy-benzalacetophenone thiosemicarbazone (M. P. 278° C., with decomposition) is obtained.

*Example 4*

Preparation of:

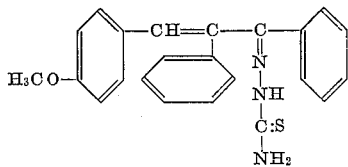

About 15.7 grams of p-methoxy-benzaldesoxybenzoin and 4.5 grams of thiosemicarbazide are boiled together for 5 days in 400 cc. of ethyl alcohol, then the alcohol is distilled off and the residue is boiled first with ligroin, thereafter with water. The residue which remains is p-methoxybenzaldesoxybenzoin thiosemicarbazone, which melts at 188° C., after being recrystallized from 80% alcohol.

Having thus described the subject matter of this invention, what it is desired to secure by Letters Patent is:

We claim:

1. Novel chemical compounds represented by the formula:

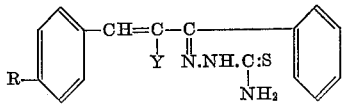

wherein R is a lower alkoxy group and Y is of the group consisting of lower alkyl, lower alkoxy, carboxy, lower carbalkoxy and phenyl.

2. Novel chemical compound represented by the formula:

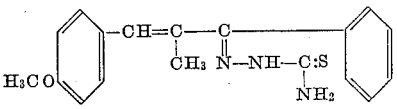

3. Novel chemical compound represented by the formula:

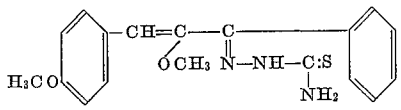

4. Novel chemical compound represented by the formula:

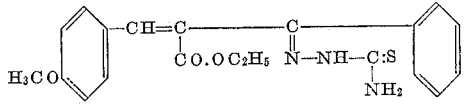

5. Novel chemical compound represented by the formula:

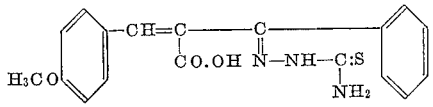

6. Novel chemical compound represented by the formula:

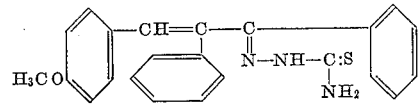

References Cited in the file of this patent

FOREIGN PATENTS

| Number | Country | Date |
|---|---|---|
| 584,381 | Great Britain | Jan. 14, 1947 |

OTHER REFERENCES

Sah et al., "Rec. Trav. Chim.," vol. 69 (1950), pp. 1545–1556.

Bose et al., "Quarterly Journal, Indian Chem. Soc.," vol. 4, pp. 84–88.